UNITED STATES PATENT OFFICE.

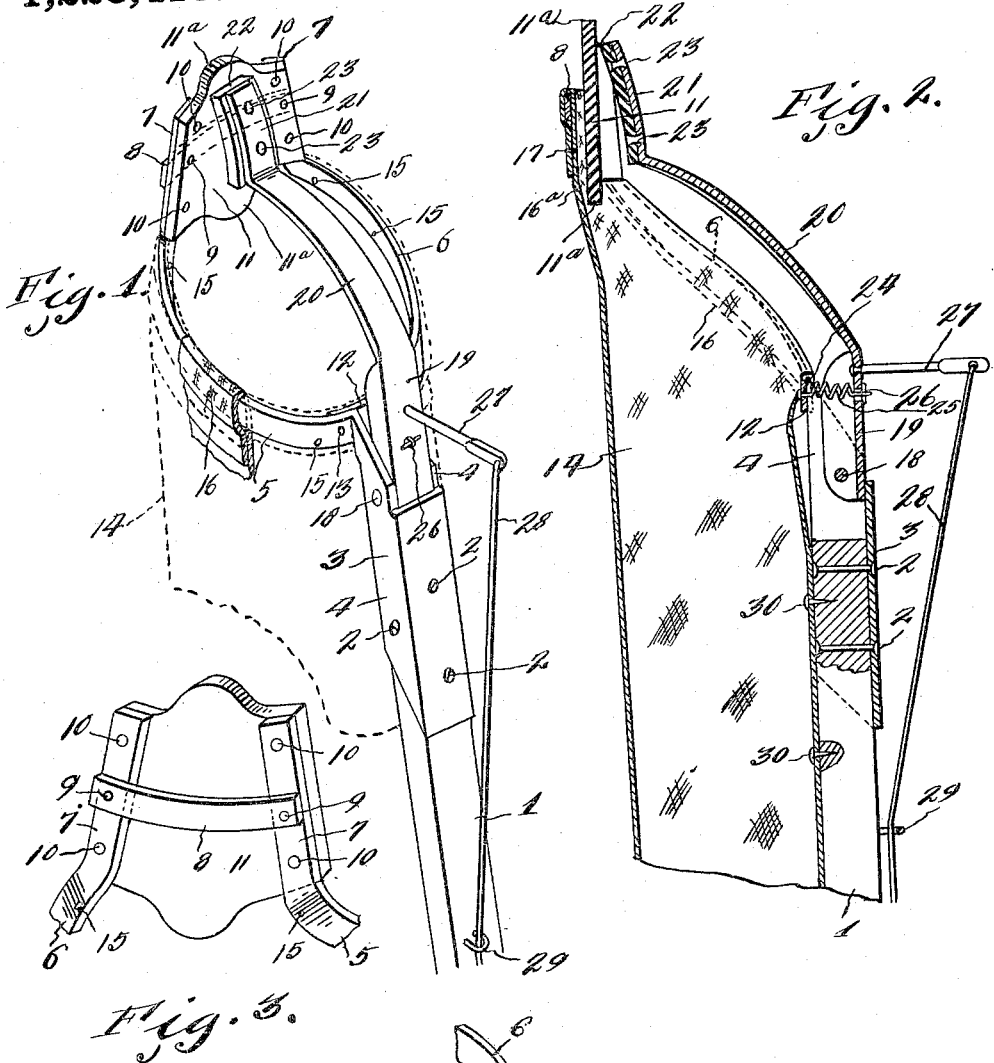

PETER T. DELENICOFF, OF NORTH McGREGOR, IOWA.

FRUIT-GATHERER.

1,228,413.

Specification of Letters Patent. Patented June 5, 1917.

Application filed July 6, 1916. Serial No. 107,790.

*To all whom it may concern:*

Be it known that I, PETER T. DELENICOFF, a citizen of the United States, residing at North McGregor, in the county of Clayton, State of Iowa, have invented a new and useful Fruit-Gatherer; and I do hereby declare the following to be a full, clear, and exact description of the invention, such as will enable others skilled in the art to which it appertains to make and use the same.

This invention relates to a new and useful fruit gatherer, and an object of the invention is to provide a device of this kind, which is very simple, and efficient and practical in construction.

Another object of the invention is to provide a gatherer consisting of a sleeve or chute from the fruit bag, and having its opening at its upper end provided with an inclined stiffening bar, to the ends of which a fiber jaw member is secured. This jaw member has its upper and lower central portions provided with yieldable portions, which, when engaging the fruit, will not injure the same. A further object of the invention is to provide a spring tensioned pivoted jaw provided with a padded jaw face to coöperate with the first jaw, to pick the fruit from the tree.

The invention comprises further features and combination of parts, as hereinafter set forth, shown in the drawings and claimed.

In practical fields the details of construction may necessitate alterations falling within the scope of what is claimed.

In the drawings:—

Figure 1 is a view in perspective of the fruit gatherer constructed in accordance with the invention.

Fig. 2 is a vertical sectional view through the same.

Fig. 3 is a detail perspective view of the rigid jaw of the stiffening bar of the upper open end of the sleeve.

Fig. 4 is a detail perspective view of the sheet metal channel member carried by the upper end of the handle of the fruit gatherer, and with the side flanges of which channel member the stiffening bar of said open end is integrally constructed.

Referring more especially to the drawings, 1 designates an elongated handle member, of which only a part thereof is illustrated, and secured by screws or the like 2 to the upper end of the member 1 is a sheet metal channel member 3. Formed integrally with and merging from the sides 4 of the channel member, and extending or curving upwardly and laterally are two curved brace arms 5 and 6, the portions 7 of which extend slightly toward each other and substantially vertical, and at obtuse angles to the bodies of the bars or arms 5 and 6. A transversely curved bar 8 is riveted at 9 to the portion 7. Secured to the portion 7 by means of the rivets or the like 10 is a cushion or rubber jaw member 11, and owing to the space between this member 11 and the curved bar 8, the center of said member 11 is slightly yieldable. However, the upper and lower edge portions of the member 11 have nothing to bear against, as does the center portion, therefore the upper and lower end portions of the member 11 are more yieldable than the central portion, thereby preventing the fruit as it is removed from being injured or bruised. Adjacent where the bars or arms 5 and 6 merge integrally from the upper ends of the flanges 4, a transverse bar 12 has its end portions riveted at 13 to the bars or arms 5 and 6. A sleeve 14 (which is designed to extend from any suitable bag or other receptacle, not shown) has its upper edge portions of the open end thereof folded over and stitched to the arms or bars 5 and 6, the apertures 15 in the bars or arms 5 and 6 receive the stitching 16, for attaching said sleeve. The upper open end portion of the sleeve is provided with an extension tongue 16ª, which is folded over the bar 8, and is stitched to the fabric sleeve as shown at 17, thereby more securely securing the sleeve to the arms or bars 5 and 6. Pivoted upon a bolt 18 which extends transversely of the channel member 3 is a second channel member 19, which is provided with a curved extension arm 20 which terminates in a substantially vertical portion 21 having a cushion or rubber plate or pad 22 riveted at 23 to the portion 21, thereby constituting a fruit grasping jaw. A coil spring has one end connected at 24 to the transverse bar 12, while the other end of the said spring 25, is connected at 26 to the second channel member 19, thereby putting the member under tension, so that the movable grasping jaw will clamp the fruit between it and the fixed jaw. Projecting from one face of the channel member 19 is an arm 27, to which one end of a pull cable, cord or wire 28 is connected, which wire or pull member passes through the eye 29, and several other similar eyes (not shown). By pulling upon the member 28, the channel member 19 is tilted upon its pivot, thereby opening the movable grasping jaw, and by releasing the member 28 the piece of fruit may be grasped between the movable jaw and the rigid jaw, until the fruit is detached from the limb. Subsequently the movable jaw is again opened, and the fruit is allowed to fall through the sleeve, into the bag or receptacle (not shown). The sleeve is attached at 30 to the elongated handle member 1, to prevent displacement of the sleeve.

Said cushioning member 11 is provided with a flexible grip 11ᵃ, there being one below and one above.

The invention having been set forth, what is claimed as new and useful is:—

In a fruit gatherer, the combination of an elongated handle member and a fruit gathering sleeve attached thereto, of a plate member secured to the upper end of the handle member and provided with curved rigid arms inclined upwardly and laterally, and to which arms the upper open end of the sleeve is attached, said arms having extensions, a curved bar connecting said extensions constituting a stationary jaw, a cushioning pad secured to said extensions and having its upper and lower edge portions yieldable to prevent bruising the fruit and provided with an upper yieldable lip, a spring tensioned member pivoted to the member carried by the handle and provided with a cushioned grasping jaw to coöperate with the stationary jaw, and means for actuating the spring tensioned member against the action of the spring means thereof.

In testimony whereof I have signed my name to this specification in the presence of two subscribing witnesses.

PETER T. DELENICOFF.

Witnesses:
E. J. ABBOTT,
W. F. HELLBERG.

Copies of this patent may be obtained for five cents each, by addressing the "Commissioner of Patents, Washington, D. C."